United States Patent [19]

Schaenzer et al.

[11] Patent Number: 5,825,181
[45] Date of Patent: Oct. 20, 1998

[54] MULTI-IMPACT THERMAL ASPERITY SENSOR HEAD

[75] Inventors: Mark J. Schaenzer, Eagan; Zine-Eddine Boutaghou, Vadnais Heights; Subrahmanyan Nagarajan, Burnsville; Ramesh Sundram, Eden Prairie, all of Minn.

[73] Assignee: Seagate Technology, Inc., Scotts Valley, Calif.

[21] Appl. No.: 831,070

[22] Filed: Apr. 1, 1997

Related U.S. Application Data

[60] Provisional application No. 60/035,944, Jan. 21, 1997.
[51] Int. Cl.$^6$ ........................................... G01R 1/00
[52] U.S. Cl. ........................ 324/212; 360/103; 360/113
[58] Field of Search .................... 324/212, 252, 324/210, 211; 360/72.1, 113, 103, 75, 73.03; 338/32 R; 369/53, 54, 58

[56] References Cited

U.S. PATENT DOCUMENTS

| | | | |
|---|---|---|---|
| 4,674,875 | 6/1987 | Koizumi | 356/237 |
| 4,881,136 | 11/1989 | Shiraishi et al. | 360/25 |
| 4,931,338 | 6/1990 | Toffle | 428/65 |
| 5,063,712 | 11/1991 | Hamilton et al. | 51/67 |
| 5,410,439 | 4/1995 | Egbert et al. | 360/75 |
| 5,412,519 | 5/1995 | Buettner et al. | 360/73.03 |
| 5,423,111 | 6/1995 | Mori | 29/90.01 |
| 5,527,110 | 6/1996 | Abraham et al. | 374/5 |
| 5,528,922 | 6/1996 | Baumgart et al. | 73/1 |
| 5,537,034 | 7/1996 | Lewis | 324/212 |
| 5,680,265 | 10/1997 | Noguchi | 360/113 |
| 5,696,643 | 12/1997 | Tsuwako et al. | 360/73.03 |
| 5,715,110 | 2/1998 | Nishiyama et al. | 360/67 |

Primary Examiner—Jay M. Patidar
Attorney, Agent, or Firm—Westman, Champlin & Kelly, P.A.

[57] ABSTRACT

An asperity height sensing head and method of using the same are disclosed. The head includes multiple magnetoresistive (MR) sensors carried by a first rail of a slider adjacent to the air bearing surface (ABS) and positioned a distance $L_p$ from each other. Asperity height estimating circuitry coupled to each of the multiple MR sensors detects a number N of the MR sensors which exhibit a change in resistance as a result of contact between the ABS and a first asperity on the surface of the disc. The asperity height estimating circuitry estimates the height $H_A$ of the first asperity as a function of the number N, as a function of the pitch angle $\theta_p$, and as a function of the distance $L_p$.

18 Claims, 5 Drawing Sheets

MULTI-IMPACT THERMAL ASPERITY SENSOR HEAD

BACKGROUND OF THE INVENTION

The present application claims the benefit of earlier filed U.S. Provisional Application No. 60/035,944, entitled "MULTI-IMPACT THERMAL ASPERITY SENSOR HEAD", filed on Jan. 21, 1997.

The present invention relates generally to disc drive data storage devices. More particularly, the present invention relates to a thermal asperity sensing head which provides detailed information as to thermal asperity defect sizes and heights.

In disc drive data storage devices, digital data are written to and read from a thin layer of magnetizable material on a surface of one or more rotating discs. Write and read operations are performed through a transducer which is carried in a slider body. The slider and transducer are sometimes collectively referred to as a head, and typically a single head is associated with each disc surface. When the transducer is a magnetoresistive (MR) type sensor, the combination of the slider and the transducer are frequently referred to as an MR head. The heads are selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly several microinches above the disc surface.

In operation, the head can come into contact with asperities on the surface of the disc while the head flies above the surface of the disc. Potentially, this undesirable contact can cause data written to a particular location on the disc to be lost. Immediately after contact with an asperity, the heat generated by the contact changes the resistive properties of the MR sensor. As a result, the corresponding signal read by the MR head is distorted by a voltage spike and subsequent decay, sometimes causing the data stored near the asperity to be unrecoverable. The voltage spike in the read signal is frequently referred to as a "thermal asperity," while the defect on the disc is referred to as an "asperity". However, since one is indicative of the other, the two terms are frequently used interchangeably.

Disc asperities which are located in the factory during a defect scanning process can be recorded in a disc drive's primary defect list, so that the drive does not store data at those locations. Thermal asperity detection for the purpose of mapping the disc defects relies both upon the fly characterization of the heads and upon the thermal response from friction induced head/asperity contact. By calibrating the slope and duration of the resistance change waveform to a range of asperity heights and characteristics, the height of a particular asperity can be determined by detecting the momentary change in resistance of the sensor after contact.

Current thermal asperity detection methods are limited to using either existing MR data heads having a narrow MR sensor track width, or to specially designed heads having an increased MR sensor track width. Each of these types of heads have inherent limitations. Using existing MR data heads, with track widths typically less than 2.5 $\mu$M, the time for a full surface scan is quite lengthy, approaching 30 minutes. Further, existing MR data heads of the type used in disc drive systems are designed to reduce sensitivity to thermal asperity response by having increased fly heights and MR sensor recession within the slider body.

Specially designed thermal asperity heads can reduce the surface scan time and increase the thermal asperity response by using a wider MR sensor track, for example, 60 $\mu$M. Using these specially designed heads, the process of mapping the disc defects while changing the fly height of the head requires several scans at different head fly heights to map the entire range of defects. As the speed is changed, the response of the specially designed head also changes. For example, if the speed is reduced, the energy of the impact is reduced, thus making it more difficult to calibrate to the defect size and height.

SUMMARY OF THE INVENTION

An asperity height sensing head and method of using the same are disclosed. The head includes multiple magnetoresistive (MR) sensors carried by a first rail of a slider adjacent to the air bearing surface (ABS) and positioned a distance $L_p$ from each other. Asperity height estimating circuitry coupled to each of the multiple MR sensors detects a number N of the MR sensors which exhibit a change in resistance as a result of contact between the ABS and a first asperity on the surface of the disc. The asperity height estimating circuitry estimates the height $H_A$ of the first asperity as a function of the number N, as a function of the pitch angle $\theta_P$, and as a function of the distance $L_P$.

DETAILED DESCRIPTION OF THE PREFERRED EMBODIMENTS

In order to overcome limitations in the prior art of detecting and mapping all of the asperities on a disc surface, including determining the size of individual asperities, the present invention includes a thermal asperity sensor head which generates multiple time-spaced impacts between a single asperity and the head. This is accomplished by fabricating multiple MR sensors on the rails of the head slider body.

Figure 1:
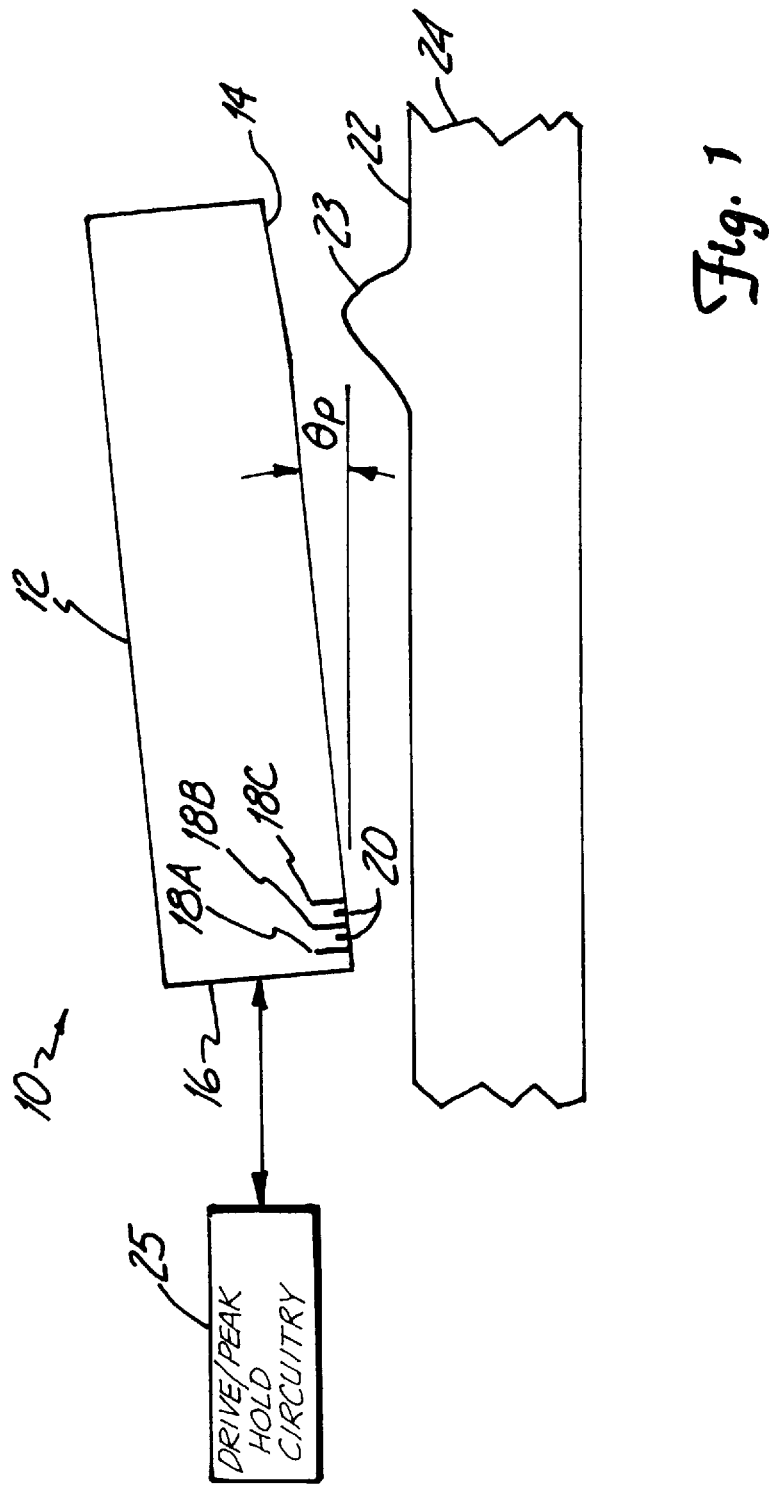
FIG. 1 is a diagrammatic side view illustrating the thermal asperity sensor head of the present invention.

FIG. 1 illustrates thermal asperity sensor head 10 in accordance with preferred embodiments of the present invention. Head 10 includes slider body 12 having ABS 14 and trailing edge 16. Head 10 also includes multiple MR sensors (only sensors 18A, 18B and 18C are illustrated in FIG. 1) adjacent ABS 14 near trailing edge 16. While only three MR sensors are illustrated in FIG. 1, preferred embodiments of the present invention include five or more MR sensors. The various MR sensors are referred to generically as sensors 18.

MR sensors 18 are fabricated at the wafer level using well known MR element (MRE) fabrication techniques from known MR materials such as NiFe. Between each adjacent pair of MR sensors (i.e., between sensors 18A and 18B), an electrically insulating layer 20 is included. Layer 20 serves both to electrically insulate adjacent MR sensors from each other, and to dissipate thermal energy generated by contact between the MR sensors and an asperity 23 on surface 22 of a disc 24. Layer 20 can be, for example, $SiO_2$, $Al_2O_3$ or other insulating materials. As head 10 flies above surface 22 of disc 24, ABS 14 forms pitch angle $\theta_P$ relative to the plane of surface 22 of the disc. In other words, head 10 flies at pitch angle $\theta_P$. As is discussed below in greater detail, the distance between sensors is closely controlled in order to achieve a desired asperity height detection sensitivity or resolution for pitch angle $\theta_P$.

Drive/peak hold circuitry 25 is coupled to MR sensors 18 through bond pads or terminals on a surface of slider body 12, typically trailing edge 16. Circuitry 25 is of the type known in the art which supplies sensing current or voltage to the MR sensors, and which can detect changes in resistance of the sensors (typically via changes in voltage or current). Ideally, circuitry 25 couples the output signals of the various sensors in such a manner that a single composite signal having a number of individually detectable resistance changes (hits) represented.

Figure 2:
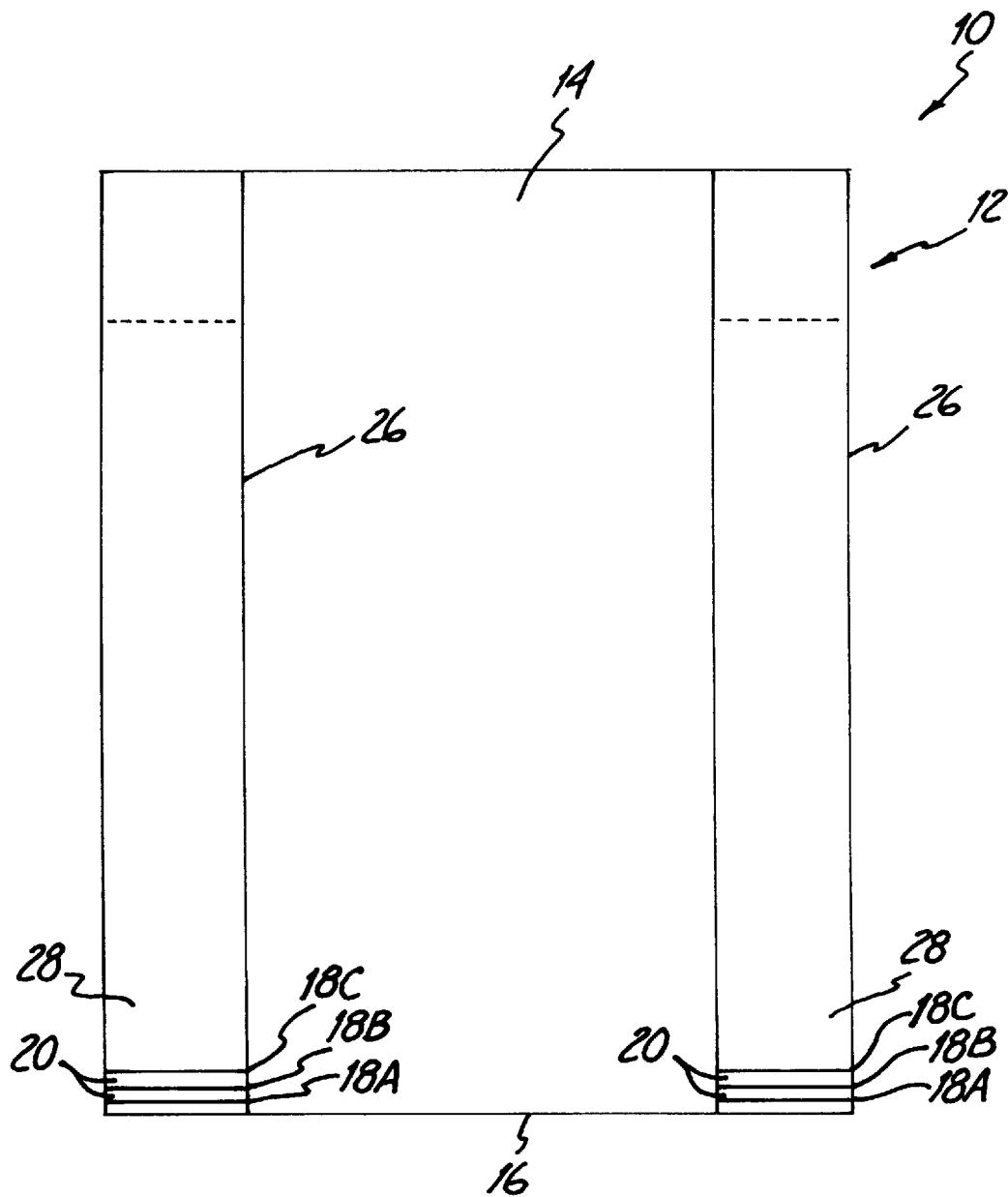
FIG. 2 is a diagrammatic ABS view of the thermal asperity sensor head illustrated in FIG. 1.

FIG. 2 is a diagrammatic ABS view of head 10 which further illustrates features of the present invention. As illustrated in FIG. 2, in some preferred embodiments slider body 12 of head 10 includes one or more rails 26 which form a portion of ABS 14. The particular embodiment illustrated is a two-rail head slider design. However, other designs such as center-rail head slider designs may only include a single rail. During the fabrication process, portions of rails 26 act as substrates 28 upon which MR sensor layers 18 and insulating layers 20 are deposited.

As illustrated, on each rail 26 of head 10, three MR sensors 18A, 18B and 18C are deposited. Thus, at least two insulating layers 20 would be required for each rail, one between sensors 18C and 18B, and one between sensors 18B and 18A. While thermal asperity sensor head 10 of the present invention is illustrated in FIGS. 1 and 2 as having three MR sensor layers on each rail, in preferred embodiments, each rail can contain five or more MR sensor layers. Further, while MR sensors 18 are illustrated on each of the rails of head 10, in other possible embodiments the MR sensors are located only on one of the rails of head 10. Also, for performance flexibility, differing sensor patterns and/or spacing can be used on each of the rails of the slider body.

Figure 3:
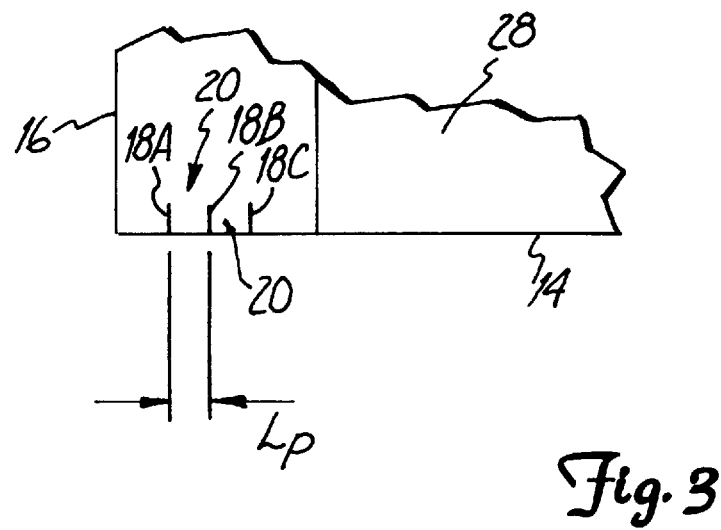
FIG. 3 is a diagrammatic side view of a portion of the thermal asperity sensor head of the present invention, which further illustrates the spacing between the multiple MR sensors of the head.

FIG. 3 is a diagrammatic side view of a portion of head 10 which illustrates the pitch (length $L_P$) between adjacent MR sensors 18. Since MR sensor layers are very thin as is known in the art, pitch $L_P$ is approximately equal to the thickness of insulating layer 20 between each pair of adjacent MR sensors. Pitch $L_P$ can be controlled, by controlling the thickness of the insulating layers, in order to achieve a desired resolution or sensitivity.

During operation in which head 10 comes into contact with an asperity on the surface of the disc, the contact duration between each MR sensor and the asperity is determined by the linear velocity of the disc and the size of the asperity. Pitch angle $\theta_P$, typically on the order of 150–200 microradians, is assumed to be small in the following calculations. The separation between MR sensors, pitch $L_P$, serves to control the resolution of the asperity height determination. Assuming that the sensors are spaced apart uniformly as illustrated in the figures, the relationship between the height of the asperity and the number of hits detected is shown in Equation 1.

$$H_A = H_{MFH} + (N * L_P * \theta_P) \qquad \text{Equation 1}$$

Where, $H_A$ = the detected asperity height;

$H_{MFH}$ = the minimum fly height of the head;

N = the number of impacts detected;

$L_P$ = the sensor lamination pitch or distance between sensors; and $\theta_P$ = the pitch angle of the head while flying.

For a slider with a pitch angle $\theta_P$ of 150 microradians, corresponding values of the sensor lamination thickness (i.e., distance $L_P$ between each of MR sensors 18) and the asperity height sensitivity or resolution are shown in Table 1.

TABLE 1

| sensor lamination pitch $L_p$ (μm): | 1 | 10 | 100 | 1000 |
|---|---|---|---|---|
| asperity height sensitivity (nm): | 0.15 | 1.5 | 15 | 150 |

In order to obtain a reasonable resolution or sensitivity, a preferred lamination pitch $L_P$ for this pitch angle $\theta_P$ is between 20 and 30 microns (μm) However, it is clear that for other pitch angles $\theta_P$ or asperity height detecting sensitivities or resolutions desired, other sensor lamination pitches would be preferred. Generally, sensor lamination pitches $L_P$ of at least 1 μm are preferred. This can be contrasted to traditional dual MR sensors having a typical spacing between sensors of approximately 500 Å (0.05 μm or microns), and to spin valve or giant MR effect heads having spacing between the various MR sensor layers of considerably less than 500 Å.

Figure 4:
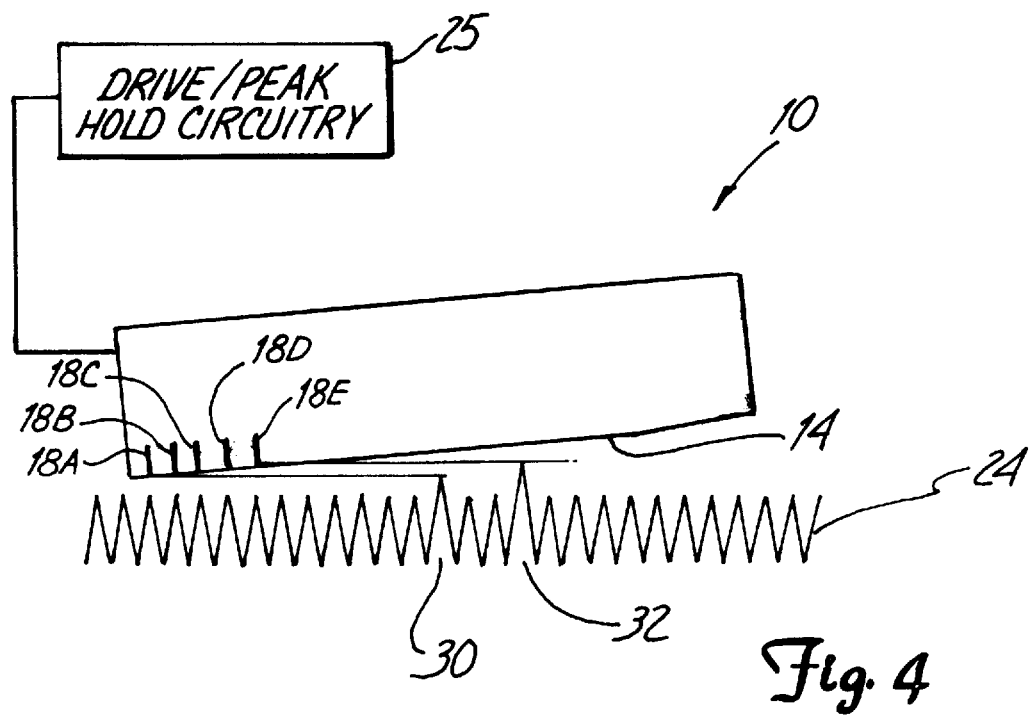
FIG. 4 is a diagrammatic side view of the thermal asperity sensor head of the present invention which illustrates the manner in which the head detects and determine the heights of various asperities on the surface of a disc.

FIG. 4 is a diagrammatic side view which illustrates the manner in which head 10 is used both to detect the location of asperities on the surface of disc 24, and to determine the heights of the various asperities detected. As head 10 flies above the surface of disc 24 at pitch angle $\theta_P$, circuitry 25 drives the MR sensors and monitors a read signal from the sensors for changes in resistance which are indicative of contact between head 10 and an asperity located on the surface of the disc.

Figure 5:
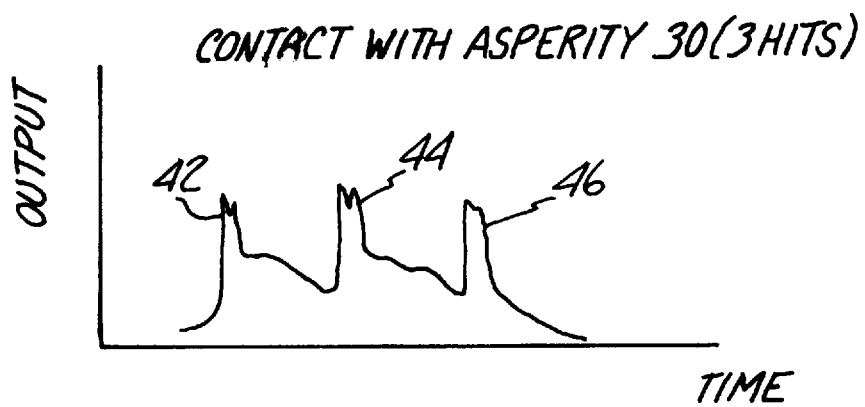
FIG. 5 is a plot illustrating an output signal from the thermal asperity sensor head of the present invention after contact with a first asperity on a surface of the disc which has a first height causing a change in resistance in three of the magnetoresistive sensors on the head.

FIG. 4 illustrates two separate asperities, asperities 30 and 32, having different heights. For convenience, both asperities are shown in FIG. 4 in close proximity to one another. However, for the sake of discussion it is assumed that the asperities are spaced apart sufficiently such that contact between asperity 30 and the slider body of head 10 is independent of contact between asperity 32 and the slider body. In other words, asperities 30 and 32 are assumed to be spaced apart far enough for the fly height and pitch angle to have stabilized, after contact with asperity 30, before contact with asperity 32. Also, in FIG. 4, head 10 includes five MR sensors 18A, 18B, 18C, 18D and 18E. A composite read signal provided by circuitry 25 after contact between head 10 and asperity 30 is illustrated in the plot of FIG. 5. A composite read signal provided by circuitry 25 after contact between head 10 and asperity 32 is illustrated in FIG. 6.

As can be seen in FIGS. 4 and 5, the height of asperity 30 is such that asperity 30 will contact the ABS 14 of head 10 adjacent MR sensors 18C, 18B and 18A, respectively. However, asperity 30 will not make contact with ABS 14 adjacent sensors 18D and 18E. In the plot of FIG. 5, voltage (or current) spike 42 is caused by the temporary change in resistance of sensor 18C after contact with asperity 30. Spikes 44 and 46 are caused by contact between asperity 30 and sensors 18B and 18A, respectively. A peak detector and counter in circuitry 25 keeps track of the number of "hits", and thereby determines the height of asperity 30.

Figure 6:
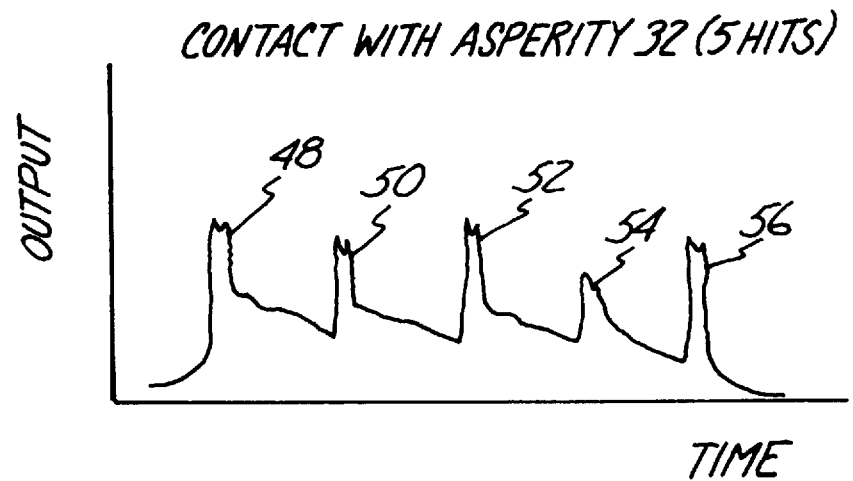
FIG. 6 is a plot illustrating an output signal from the thermal asperity sensor head of the present invention after contact with a second asperity on a surface of the disc which has a second height causing a change in resistance in five of the magnetoresistive sensors on the head.

As can be seen in FIGS. 4 and 6, because asperity 32 is taller than asperity 30, it will contact MR sensors 18E, 18D, 18C, 18B and 18A, respectively. Thus, five distinct peaks (impacts or hits) will be detected by circuitry 25. In FIG. 6, spikes 48, 50, 52, 54 and 56 correspond to contact between asperity 32 and sensors 18E, 18D, 18C, 18B and 18A, respectively. Using the relationship shown in Equation 1, height $H_A$ of each asperity can be determined from the number of hits N, the known sensor lamination pitch $L_P$, the minimum fly height $H_{MFH}$ of ABS 14, and the pitch $\theta_P$ of the slider.

Figure 7A:
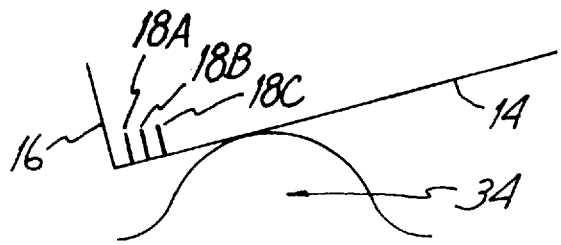
FIGS. 7A–7D are diagrammatic illustrations which demonstrate the manner in which previously undetected asperities can be detected using the thermal asperity sensor head of the present invention.
Figure 7B:
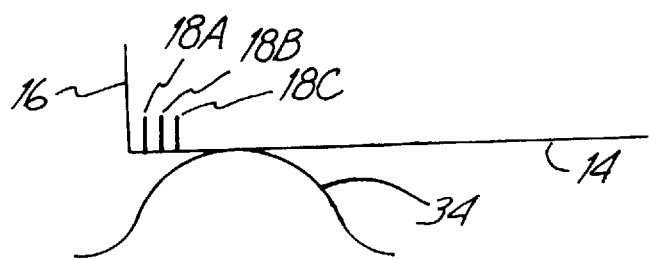
Figure 7C:
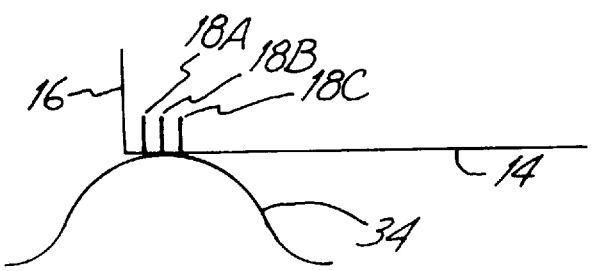
Figure 7D:
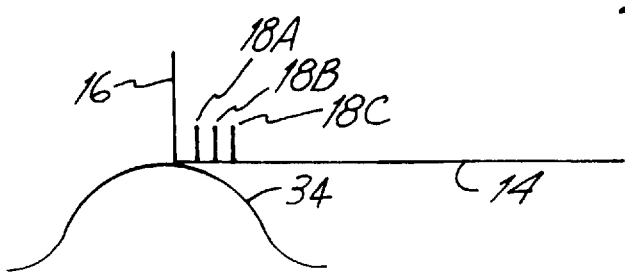

In addition to providing the ability to accurately determine the heights of asperities on the surface of the discs, the multiple MR sensors of head 10 of the present invention increases the probability that thermal asperities will be detected from contact with broad shallow defects. In conventional thermal asperity detecting heads having only a single sensor, contact between an asperity and the ABS can temporarily alter the flight of the head such that the MR sensor/asperity contact does not produce a thermal asperity in the read out signal. As illustrated progressively in FIGS. 7A and 7B, the initial contact between ABS 14 and asperity 34 can alter the fly height and pitch angle $\theta_P$ of the head temporarily. As shown progressively in FIGS. 7C and 7D, because of the altered flight of the head, MR sensor 18C makes contact with asperity 34, but MR sensors 18A and 18B do not. Thus, by including multiple MR sensors spaced apart on ABS 14 of the slider body, the likelihood that at least one of the MR sensors will contact broad shallow defects, such as asperity 34, increases. Without the benefit of the multiple spaced apart MR sensors of the present invention, the presence of asperity 34 might go undetected.

Although the present invention has been described with reference to preferred embodiments, workers skilled in the art will recognize that changes may be made in form and detail without departing from the spirit and scope of the invention.

What is claimed is:

1. An asperity sensing head for use in detecting asperities on a surface of a disc as an actuator moves the head relative to the surface while the disc is rotated, the asperity sensing head comprising:
   a slider body having a first rail and an air bearing surface;
   a first magnetoresistive (MR) sensor carried by the slider body in the first rail and adjacent to the air bearing surface; and
   a second MR sensor carried by the slider body in the first rail and adjacent to the air bearing surface, wherein the first MR sensor is separated from the second MR sensor by at least about 1 micron.

2. The asperity sensing head of claim 1, and further comprising a first electrically insulating layer carried by the slider body in the first rail between the first MR sensor and the second MR sensor, wherein the first electrically insulating layer separates the first MR sensor from the second MR sensor by at least about 1 micron.

3. The asperity sensing head of claim 2, wherein contact between an asperity on the disc surface and the air bearing surface of the slider body proximate the first MR sensor causes the resistance of the first MR sensor to change, and wherein contact between an asperity on the disc surface and the air bearing surface of the slider body proximate the second MR sensor causes the resistance of the second MR sensor to change.

4. The asperity sensing head of claim 3, wherein the asperity sensing head has a pitch angle associated therewith, the asperity sensing head flying above the surface of the disc at the pitch angle such that a height of a first asperity on the surface of the disc can be determined as a function of whether the first asperity contacts the air bearing surface proximate only the first MR sensor or whether the first asperity contacts the air bearing surface proximate both the first and second MR sensors.

5. The asperity sensing head of claim 4, wherein the first MR sensor layer is separated from the second MR sensor layer by between about 1 micron and about 100 microns.

6. The asperity sensing head of claim 5, wherein the first MR sensor layer is separated from the second MR sensor layer by between about 5 microns and about 40 microns.

7. The asperity sensing head of claim 6, wherein the first electrically insulating layer comprises a thermally conductive material.

8. An apparatus for detecting heights of asperities on a surface of a disc, the apparatus comprising:
   a slider having a first rail forming a portion of an air bearing surface of the slider, the slider flying above the surface of the disc at a pitch angle $\theta_P$ as the disc is rotated;
   a first plurality of magnetoresistive (MR) sensors carried by the slider in the first rail adjacent to the air bearing surface of the slider, wherein each of the first plurality of MR sensors is positioned a distance $L_P$ from the adjacent one of the first plurality of MR sensors, wherein the distance $L_P$ is at least about 1 micron; and
   asperity height estimating circuitry coupled to each of the first plurality of MR sensors, the asperity height estimating circuitry detecting a number N of the first plurality of MR sensors which exhibit a change in resistance as a result of contact between the air bearing surface of the slider and a first asperity on the surface of the disc, wherein the asperity height estimating circuitry estimates the height $H_A$ of the first asperity as a function of the number N, as a function of the pitch angle $\theta_P$, and as a function of the distance $L_P$.

9. The apparatus of claim 8, wherein the slider has a minimum fly height $H_{MFH}$ associated therewith, and wherein the asperity height estimating circuitry estimates the height $H_A$ of the first asperity as a function of the number N of the first plurality of MR sensors which exhibit a change in resistance, as a function of the pitch angle $\theta_P$, as a function of the distance $L_P$, and as a function of the minimum fly height $H_{MFH}$ based upon the relationship $H_A = H_{MFH} + (N^* L_P^* \theta_P)$.

10. The apparatus of claim 9, wherein the distance $L_P$ is between about 1 micron and about 100 microns.

11. The apparatus of claim 10, wherein the distance $L_P$ is between about 5 microns and about 40 microns.

12. The apparatus of claim 10, and further comprising a first plurality of electrically insulating layers carried by the slider in the first rail, wherein one of the first plurality of insulating layers is located between each two adjacent ones of the first plurality of MR sensors and separates the two adjacent ones of the first plurality of MR sensors by the distance $L_P$.

13. The apparatus of claim 12, wherein each of the first plurality of electrically insulating layers comprises a thermally conductive material in order to dissipate heat from the adjacent MR sensors after contact with the first asperity.

14. The apparatus of claim 13, wherein the slider has a second rail forming a portion of the air bearing surface of the slider, the apparatus further comprises a second plurality of MR sensors carried by the slider in the second rail adjacent to the air bearing surface, wherein each of the second plurality of MR sensors is positioned at least the distance $L_P$ from the adjacent one of the second plurality of MR sensors, and wherein the asperity height estimating circuitry is coupled to each of the second plurality of MR sensors.

15. A method of determining a height of an asperity on a surface of a disc, the method comprising:

flying a slider above the surface of the disc at a pitch angle $\theta_P$ as the disc is rotated, wherein the slider has a first rail and a plurality of magnetoresistive (MR) sensors in the first rail adjacent to the air bearing surface of the slider and positioned at least a distance $L_P$ from one another;

detecting a number N of the plurality of MR sensors which exhibit a change in resistance in response to contact between the asperity and the air bearing surface of the slider; and determining a height $H_A$ of the asperity as a function of the number N.

16. The method of claim 15, wherein determining the height $H_A$ of the asperity as a function of the number N further comprises determining the height $H_A$ of the asperity as a function of the number N, as a function of the pitch angle $\theta_P$, and as a function of the distance $L_P$.

17. The method of claim 16, wherein the slider has a minimum fly height $H_{MFH}$ associated therewith, and wherein determining the height $H_A$ of the asperity as a function of the number N further comprises determining the height $H_A$ of the asperity as a function of the number N, as a function of the pitch angle $\theta_P$, as a function of the distance $L_P$, and as a function of the minimum fly height $H_{MFH}$.

18. The method of claim 17, wherein determining the height $H_A$ of the asperity as a function of the number N further comprises determining the height of the asperity based upon the relationship $H_A = H_{MFH} + (N * L_P * \Theta_P)$.

* * * * *